Aug. 1, 1967  D. R. SHIELDS  3,333,479
VARIABLE RATIO GEARING AND TRANSMISSIONS
Filed April 26, 1965  3 Sheets-Sheet 1
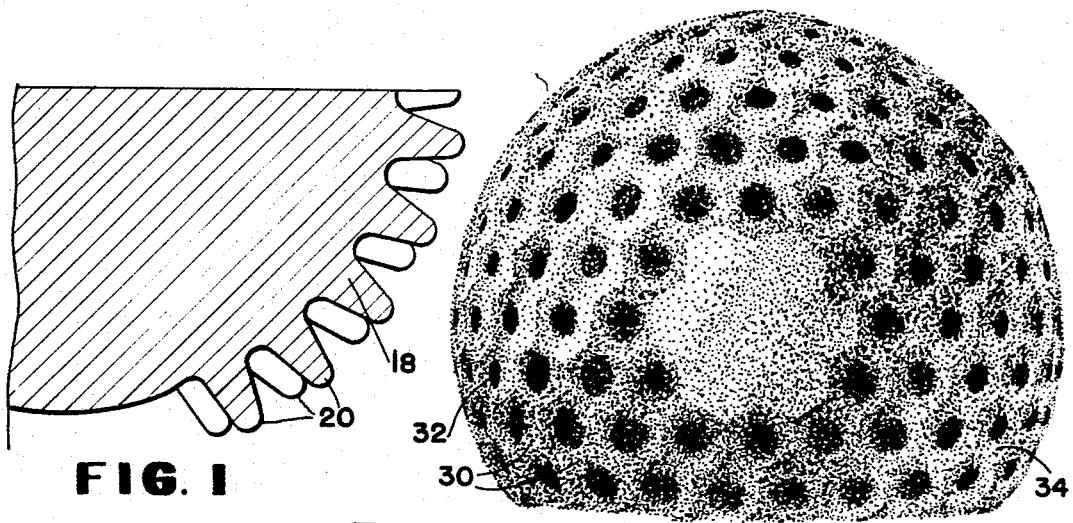
FIG. 1
FIG. 2
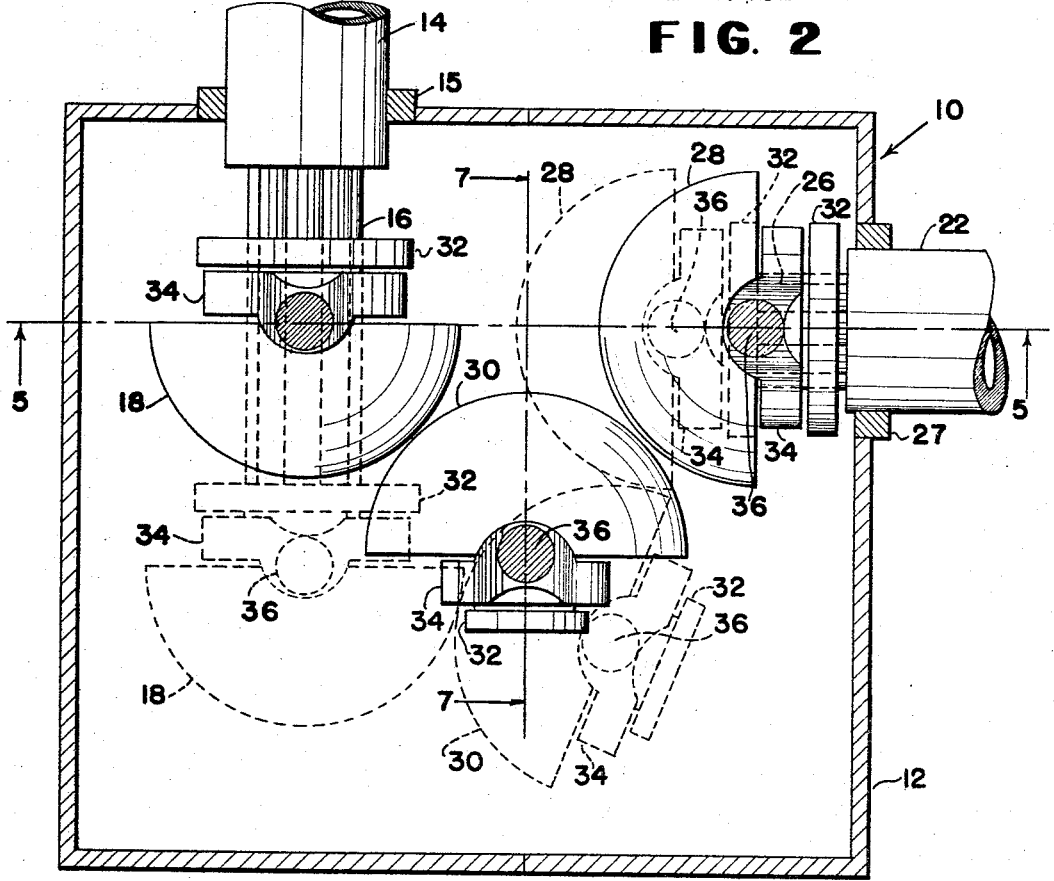
FIG. 3
INVENTOR.
DON R. SHIELDS
BY John H. Widdowson
ATTORNEY Aug. 1, 1967  D. R. SHIELDS  3,333,479
VARIABLE RATIO GEARING AND TRANSMISSIONS
Filed April 26, 1965  3 Sheets-Sheet 2
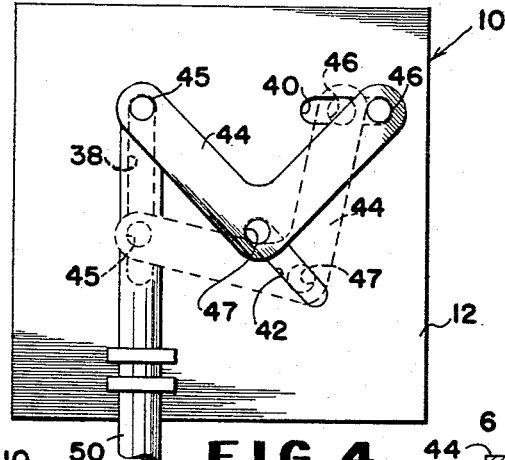
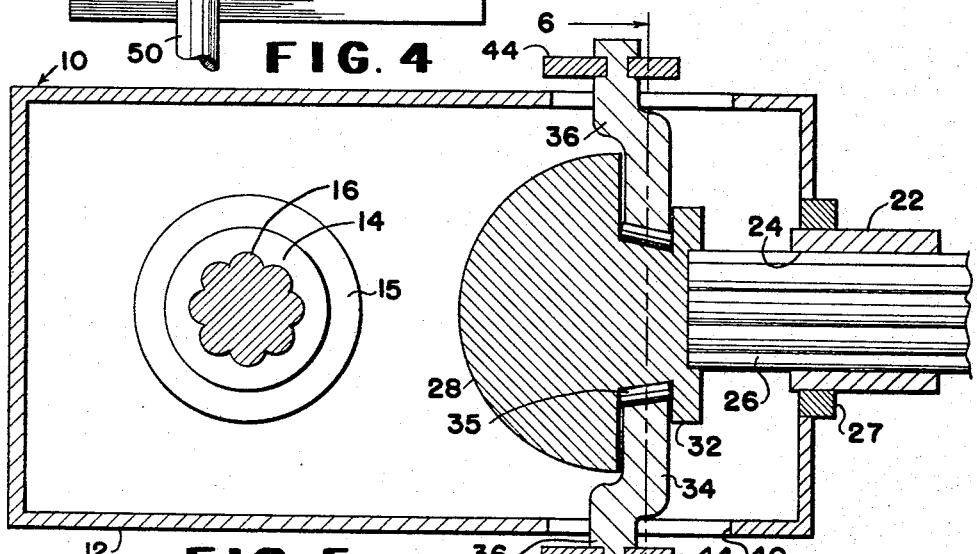
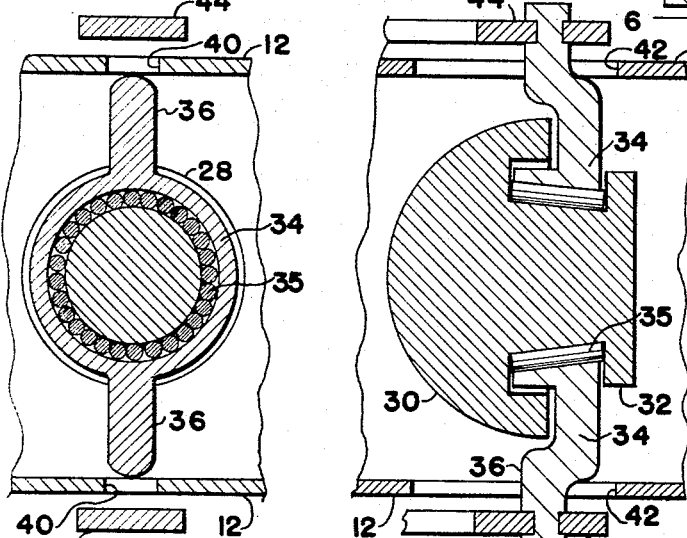
INVENTOR.
DON R. SHIELDS
BY
John H. Widdowson
ATTORNEY Aug. 1, 1967  D. R. SHIELDS  3,333,479
VARIABLE RATIO GEARING AND TRANSMISSIONS
Filed April 26, 1965  3 Sheets-Sheet 3

*INVENTOR.*
DON R. SHIELDS
BY
*John H. Widdowson*
ATTORNEY

United States Patent Office 3,333,479
Patented Aug. 1, 1967

3,333,479
VARIABLE RATIO GEARING AND
TRANSMISSIONS
Don R. Shields, Tokyo, Japan
(2420 S. Mead, Wichita, Kans. 67216)
Filed Apr. 26, 1965, Ser. No. 450,911
11 Claims. (Cl. 74—198)

ABSTRACT OF THE DISCLOSURE

This invention relates to gears and gear transmissions. More specifically the invention relates to gears and gear transmissions adapted to continuously and smoothly vary the rotation ratio of a driving shaft relative to a driven shaft. Still more specifically the invention relates to generally hemispherically shaped gears having a novel meshing means thereon which provides a positive driving engagement irrespective of the relative inclination of the rotational axes of the gears, and transmissions utilizing such gears. Additionally, the invention relates to a transmission means having a first axially movable drive gear, a second axially movable driven gear, a third intermediate transmission gear interconnected to the first and second gears, and means for rotatably rocking and supporting the third gear to vary the relative rotational ratio of the first and second gears.

---

Variable ratio drive mechanisms, often termed variable speed gearing, are relatively old in the art. Many of the variable ratio or variable speed drive mechanisms employ irregular shaped drive units, frequently coned shaped, which are connected in driving relation by frictional engagement. These known mechanisms work fairly well in principle, but are unsuited when a positive drive for transmitting large torques are necessary. In general, these devices are relatively cumbersome, inefficient and suited for transmitting only relatively small torques. Frequently, the coefficient of friction changes with atmospheric conditions, wear, and environmental changes to render the devices inoperative. Also the engaging surfaces wear relatively quickly presenting serious maintenance problems.

Various ratio drive mechanisms utilizing gears are known, but also have not proven satisfactory in use. These devices frequently employ various shaped gear type units provided with teeth. In general, the changing of the rotation ratio of such devices involves stopping the unit and changing the relative position of the drive units. This is often objectionable because intermittent transmission of power is frequently undesirable. Other such units employ spherical shaped gears with spaced engaging rows of teeth. These units have complex support arrangements for tilting the gear units to maintain a meshing engagement between the teeth and the engaging apertures on the units. However, with this type unit the rotation ratio cannot be smoothly and continuously changed. This type unit also presents serious maintenance problems, is expensive, and is generally not adapted to be constructed sufficiently rugged for use in a large number of applications.

In general, the drive mechanisms of the prior art do not provide a positive meshing engagement of the drive units which can be used to transmit large torques, and also which can be used to continuously vary the rotation ratio of the driving and driven shafts without interruption.

I have invented a new transmission. The new transmission of my invention has a first gear with a segmental spherical shaped surface, a second gear having a segmental spherical shaped surface, and a third gear having a segmental spherical shaped surface. Means are provided on the segmental spherical shaped surfaces of the first, second and third gears to connect them in positive driving engagement. Means is also provided for movably supporting the third gear in operative engagement with the first and second gears.

A sub-combination of my invention is a new gear combination. The new gear combination of my invention has a first gear having a segmental spherical shaped surface, and a second gear having a segmental spherical shaped surface. Engagement means are provided on the segmental spherical shaped surfaces of the first and second gears to connect them in meshing engagement. The gears are adapted to maintain a positive driving relation when the relative angle of the axes of rotation of the gears is varied.

The new transmission of my invention solves all of the problems common to analogous type transmissions known to the prior art. My new transmission employs gear units which provide a positive driving engagement making possible the transmission of relatively large torques. The rotation ratio of the transmission of my invention can be continuously and smoothly varied to achieve any specific desired mechanical advantage and/or rotation speed. The rotation ratio can be changed without interrupting the flow of power through the transmission. Still further the construction and assembly of my transmission is relatively simple making it relatively inexpensive to manufacture and to maintain. Another important aspect of my new transmission is that it is very efficient in that there are practically no frictional losses encountered in its operation.

The new gear sub-combination of my invention solves all of the problems analogous to gear combinations known to the prior art. The gear combination of my invention provides a positive driving engagement which makes possible the transmission of relatively large torques. The gears of my combination will maintain a driving meshing engagement irrespective of the relative inclination of the axes of rotation of the gears. In specific combination of my gears, changing the inclination of the axes of rotation changes the radii of the lines of meshing, thereby making possible the varying of the rotation ratios of the gears.

An object of this invention is to provide new transmission means.

Another object of this invention is to provide a new transmission means which enables the transmission of relatively large torques.

Still another object of this invention is to provide a new transmission in which the rotational ratio of the driving shaft and the driven shaft can be varied to achieve any specific desired mechanical advantage and/or angular velocity.

Another object of this invention is to provide a new transmission capable of providing a positive drive in which the rotational ratio of the driving and driven shaft can be continuously varied.

Still another object of this invention is to provide a new transmission which is relatively simple in operation.

Another object of this invention is to provide a new transmission that is relatively inexpensive to manufacture and to maintain.

Another object of this invention is to provide a new gear combination in which the relative angle of the rotational axes of the gears can be changed and which provides a positive driving engagement.

Another object of this invention is to provide a new gear combination which makes possible the smooth and uninterrupted changing of the rotational ratio of the gears.

Other objects and advantages of the new transmission and gear combination of my invention will become apparent to those skilled in the art upon reading the disclosure.

Drawings accompany and are a part of this disclosure. These drawings depict preferred specific embodiments of the new tansmission of my invention, and the new gear sub-combinations thereof, and it is to be understood that such drawings are not to unduly limit the scope of my invention. In the drawings, FIG. 1 is a cross sectional view of a preferred specific embodiment of the new gear of my invention taken on a longitudinal plane.

FIG. 2 is a top view of a preferred specific embodiment of the mating gear for the gear shown in FIG. 1.

FIG. 3 is a top plan view in partial cross section of a preferred specific embodiment of the new transmission of my invention illustrated with the meshing means on the gears omitted.

FIG. 4 is a top plan view of the transmission shown in FIG. 3.

FIG. 5 is a cross sectional view taken on line 5—5 of FIG. 3.

FIG. 6 is a cross sectional view in broken section taken on line 6—6 of FIG. 5.

FIG. 7 is a cross sectional view in broken section taken on line 7—7 of FIG. 3.

Figure 8:
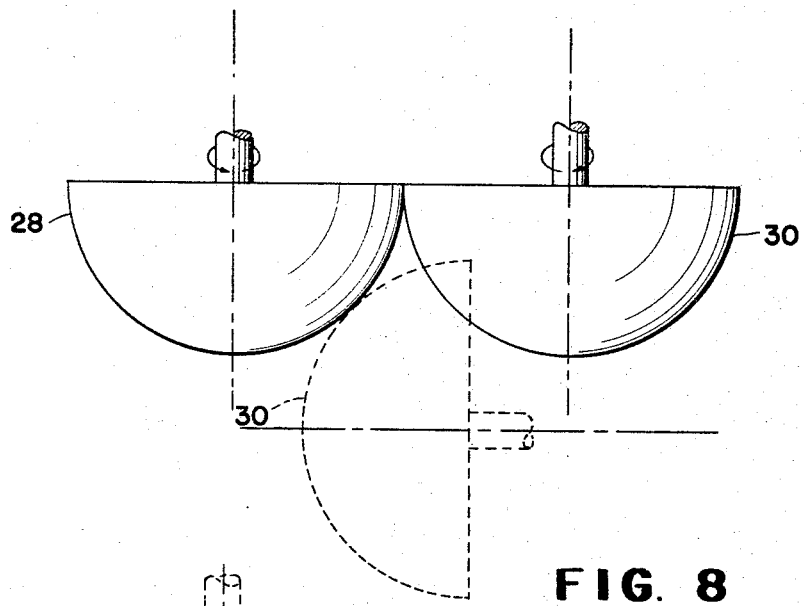
FIG. 8 is a diagrammatic view illustrating a preferred specific embodiment of the gear sub-combination of my invention.

The following is a discussion and description of the new transmission and sub-combinations thereof of my invention made with reference to the drawings, wherein the same reference numerals are used to indicate the same or similar parts and/or structure. The discussion and description is of preferred specific embodiments of the new transmission of my invention, and it is to be understood that such are not to unduly limit the scope of my invention.

Referring now to the drawings FIGS. 1 through 9, there is depicted a preferred specific embodiment 10 of the variable ratio gear transmission of my invention. The overall combination of the transmission 10 of my invention is perhaps best illustrated in FIG. 3. The transmission consists of a casing 12 which can be of any suitable shape, but preferably is rectangular in shape. A driving shaft 14 has an end portion disposed within casing 12 and is provided with a longitudinally extending splined aperture in the end portion. A bearing means 15 is provided to rotatably mount driving shaft 14 on casing 12. A splined shaft 16 is slidably disposed in the aforementioned splined aperture in driving shaft 14, and has mounted on the end thereof a hemispherical gear 18. It can be seen that with this arrangement that the hemispherical gear 18 can be moved along the longitudinal axis of shaft 14 while maintaining a driving relation, since the splines on the splined shaft 16 are received in the splined aperture in the driving shaft 14.

As more clearly indicated in FIG. 1 of the drawings, the spherical surface of hemispherical gear 18 is provided with a plurality of spaced radially projecting teeth 20. The teeth 20 are arranged on the hemispherical surface of the gear 18 in a very special way. It can be mathematically proven that a series of uniform hexagons can be inscribed on a spherical surface. The same is true of triangles. In FIG. 2 is illustrated in dotted lines the appearance of a spherical surface having a plurality of uniformly sized hexagons 34 inscribed thereon. The teeth 20 on gear 18 are positioned to assume the centers of adjacent uniformly sized hexagons when inscribed on the hemispherical surface. The specific arrangement of the projecting teeth will become apparent during the following disclosure of applicant's invention. The teeth 20 can be of any suitable shape and are preferably tapered as shown in FIG. 1. However, if desired, the teeth 20 can be cylindrically shaped pegs mounted in any suitable fashion on the spherical surface of gear 18. Basically the same symmetrical positioning of teeth 20 can be achieved by inscribing equilateral triangles on the surface and arranging the teeth accordingly. As indicated in FIG. 1, the teeth 20 are provided in band areas generally spaced from the rotational axis of the gear. If desired, the band can be wider or narrower, or can extend over the entire hemispherical surface of the gear.

Referring to FIG. 3, there is shown a driven shaft 22 having an end portion disposed within casing 12. The longitudinal axis of driven shaft 22 intersects and is transverse to the longitudinal axis of driving shaft 14. The driven shaft 22 is provided with a longitudinally extending splined aperture 24, which slidably receives a splined shaft 26. A bearing means 27 is mounted in casing 12 to rotatably support driven shaft 22. A hemispherical gear 28 is rigidly mounted on the extending end of splined shaft 26. It can be seen that the gear 28 can be moved longitudinally relative to shaft 22 while maintaining a driving relationship between same and shaft 22. A plurality of spaced radially projecting teeth, not shown in detail in FIG. 3, are provided on the hemispherical surface of gear 28. The shape and arrangement of the teeth on gear 28 is identical to the shape and arrangement of the teeth provided on gear 18. A hemispherical gear 30 is also provided which is maintained in meshing engagement with gear 18 and 28 in a manner shown in FIGS. 3 and 9. Hemispherical gear 30 is provided with a plurality of radially inwardly directed apertures 32 which are uniformly positioned to assume centers of adjacent uniformly sized hexagons 34 when inscribed on the hemispherical surface. The detailed structure of gear 30 is shown in FIG. 2. As indicated the apertures 32 are preferably provided in an area or band about the gear. The positioning of the apertures on the hemispherical surface of gear 30 is identical to the positioning of the projecting teeth 20 on gears 18 and 28. The apertures 32 in gear 30 are shaped to receive the projecting teeth 20 on gears 18 and 28. The sizes of the hexagons inscribed on gear 30 to locate the apertures are of the same size used to locate the projections 20 on gears 18 and 28. The size of the hexagons 34 can be of any suitable size. The smaller the size of the hexagons, the closer the spacing of the apertures and projecting teeth will be. The length of the teeth and the depth of the apertures 32 can be determined from a practical consideration of the teeth spacing and the radii of the hemispherical surfaces of the gears. When hemispherical gears are provided with teeth and apertures positioned in the manner described hereinbefore, a positive meshing driving engagement can be maintained between the gears, while the relative angle between the axes of rotation of the gears is varied. It is believed evident that a positive driving engagement is provided between the gears of my invention, as for example gears 18 and 30, even though the angles of the axes of rotation are varied. By varying the inclination of gear 30, as shown in FIG. 3, the radii of the lines of meshing contact on gears 18 and 30 are varied, thereby providing a different rotational ratio for each angle of relative inclination of the longitudinal axis of driving shaft 14 and the axis of rotation of gear 30.

A means is provided to maintain the gear 30 in rockable and meshing engagement with gears 18 and 28. The structure to accomplish this purpose includes collars 32 on each of gears 18, 28 and 30. Rings 34 are rotatably mounted in each of the collars 32 on gears 18, 28 and 30. As indicated in FIGS. 5, 6 and 7 a bearing means 35, preferably roller bearings, support the gears on the respective rings 34. By providing tapered roller bearings, a suitable means is provided to maintain, without large friction losses, the longitudinal thrust force to maintain the gears in close meshing engagement. However, any suitable type of bearing arrangement can be used. Opposed transversely extending shaft portions 36 are provided on each of the rings 34. The shaft portions 36 are positioned to coincide with the major diameters of the hemispherical surfaces of the gears. The casing 12 is provided with slots or suitable guides to receive and guide the shaft portions 36. As shown in FIG. 4 a slot means 38 is provided to receive the extending end portions of the shafts 36 of the ring mounted on gear 18. The slot 38 extends parallel to the longitudinal axis of driving shaft 14. A second slot 40 is provided in the casing which extends parallel to the longitudinal axis of the driven shaft 22 and receives the extending end portions of the shafts 36 of the ring mounted on gear 28. A third slot means 42 is also provided in the casing which is positioned diagonally out of slots 38 and 40 and receives the extending end portions of the shaft 36 of the ring mounted on gear 30. It is understood that other suitable guide means can be substituted for the slots 38, 40 and 42, for example, grooves in the sides of the casing 12. Spaced L-shaped yoke elements 44 hold the rings in the desired relationship. Each of the yoke elements has an aperature 45 on the end of one leg to rotatably receive the shaft portion 36 mounted on the ring on gear 18, a second aperture on the end of the opposite leg to receive the shaft portion 36 mounted on the ring of the gear 28, and a third aperture 47 in the intermediate portion to receive the shaft portion 36 mounted on the ring on gear 30. In FIG. 4 is illustrated in solid and dotted lines two relative positions of the yoke 44 which in turn moves the relative positions of gears 18, 28 and 30 to achieve different rotation ratios of the driving and driven shafts. Any suitable means can be used to rock the yoke element 44 and third gear as for example a rod 50 attached to yoke 44.

Figure 9:
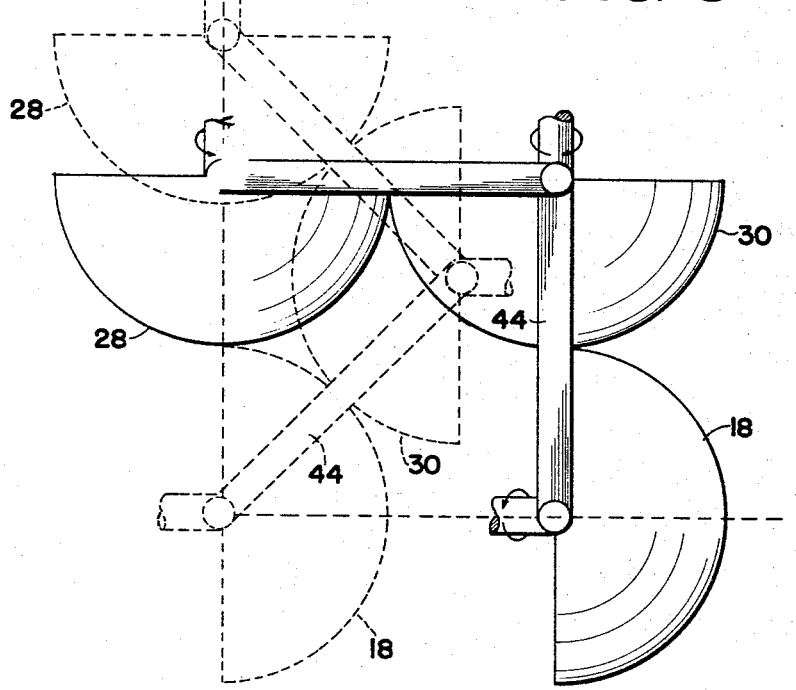
FIG. 9 is a diagrammatic view illustrating alternate positions of the gear units of the new transmission of my invention.

In FIG. 8 is shown a sub-combination gear means of my invention. The gears illustrated are gears 28 and 30. Gear 30 is shown in dotted lines positioned with the rotational axis thereof transverse to the rotational axis of gear 28. With this arrangement the rotation ratio is not varied as the angle formed by the rotational axes of the respective gears is varied. In another gear sub-combination of my invention, namely gears 18 and 30, shown in FIG. 3 in two different positions in solid and dotted lines, the rotation ratio of these two gears varies as the angle formed by the rotation axes is varied. In FIG. 9 is shown diagrammatically in solid and dotted lines two different relative positions of the gear arrangement of my new transmission 10. When the gears are in the relative position shown in solid lines, one revolution of driving gear 18 will rotate the driven gear 28 many revolutions. It can be seen that one revolution of gear 18, having a line of contact very near the circumference of the hemispherical surface, engages a line of contact which is very small and positioned concentric to the rotational axis of gear 30, and causes many revolutions of gear 30. The rotation ratio of gears 18 and 30 is equal to the ratio of the diameters of the respective lines of contact. One revolution of gear 30 will rotate gear 28 one revolution. In contrast when the gears are in the relative position shown by the dotted lines, the rotation ratio is much smaller. One rotation of driving gear 18 will rotate driven gear 28 approximately one revolution. This is true provided the diameters of the lines of contact of gears 18 and 30 are equal. The relative positions of gears 18 and 30 thereby determine the rotation ratio of the gear relationship achieved in the transmission of my invention. It should also be noted that the yoke 44 retains its shape provided that the sizes of the gears 18, 28 and 30 are equal.

The transmission of my invention can, if desired, be used as a friction drive mechanism, the gears can be modified by the deletion of teeth and apertures, and a material selected having a suitably high coefficient of friction for either covering the surface of the gears or forming same.

As will be obvious to those skilled in the art various changes and modifications of the preferred transmission and sub-combinations of my invention as described herein can be made or followed without departing from the spirit of the disclosure or the scope of the claims.

I claim:

1. A variable ratio gear transmission comprising, a casing, a driving shaft having an end portion disposed within said casing, a longitudinally extending splined aperture in said driving shaft, a first bearing means rotatably mounting said driving shaft on said casing, a first splined shaft slidably disposed in said splined aperture in said driving shaft, a first hemispherical gear mounted on said first splined shaft, a plurality of spaced radially projecting teeth on said first hemispherical gear uniformly and symmetrically positioned to assume the centers of adjacent uniformly sized hexagons when inscribed on the hemispherical surface, a driven shaft having an end portion disposed within said casing and positioned transverse to the longitudinal axis of said driving shaft, a longitudinally extending splined aperture in said driven shaft, a second bearing means rotatably mounting said driven shaft on said casing, a second splined shaft slidably disposed in said splined aperture in said driven shaft, a second hemispherical gear mounted on said second splined shaft, a plurality of spaced radially projecting teeth on said second hemispherical gear uniformly and symmetrically positioned to assume centers of adjacent uniformly sized hexagons when inscribed on the hemispherical surface, a third hemispherical gear in engagement with said first and second hemispherical gears, said third hemispherical gear having a plurality of radially inwardly directed apertures uniformly positioned to assume centers of adjacent uniformly sized hexagons when inscribed on the hemispherical surface, said apertures receiving said projecting teeth of said first and said second hemispherical gears and providing a driving relation therebetween, a means to maintain said third gear in rockable and meshing engagement with said first and said second gears, comprising, collars on each of said first, second, and third gears, rings rotatably mounted in each of said collars, opposed transversely extending shaft portions on each of said rings positioned to coincide with the major diameters of spherical surfaces of the gears, first slot means in said casing extending parallel to the longitudinal axis of said driving shaft receiving the extending end portions of said shafts on said ring mounted on said first gear, second slot means in said casing extending parallel to the longitudinal axis of said driven shaft receiving the extending end portions of said shafts on said ring mounted on said second gear, third slot means in said casing positioned diagonally of said first and second slot means receiving the extending end portions of said shafts on said ring mounted on said third gear, spaced L-shaped yoke elements securing said shafts of said rings in parallel relationship, each of said yoke elements having a first aperture on the end of a leg rotatably receiving a shaft portion mounted on said ring on said first gear, a second aperture on the end of the opposite leg receiving a shaft portion mounted on said ring on said second gear, and a third aperture in the intermediate portion receiving a shaft portion mounted on said ring on said third gear, and a means to rock said yoke elements and third gear, said transmission adapted to continuously vary the rotation ratio of the driving shaft and driven shaft when said third gear is rocked to vary the radius of the lines of meshing contacts of said first, second and third gears.

2. A variable ratio gear transmission comprising, a casing, a driving shaft having an end disposed within said casing, a longitudinally extending splined aperture in said driving shaft, a first splined shaft slidably disposed in said splined aperture in said driving shaft, a first hemispherical gear mounted on said first splined shaft, a plurality of spaced radially projecting teeth mounted on said first hemispherical gear positioned to assume centers of adjacent uniformly sized hexagons when inscribed on the hemispherical surface, a driven shaft having an end portion disposed within said casing and positioned transverse to the longitudinal axis of said driving shaft, a longitudinally extending splined aperture of said driven shaft, a second splined shaft slidably disposed in said splined aperture in said driven shaft, a second hemispherical gear mounted on said second splined shaft, a plurality of spaced radially projecting teeth on said second hemispherical gear positioned to assume the centers of adjacent uniformly sized hexagons when inscribed on the hemispherical surface, a third hemispherical gear in engagement with said first and second gears, said third hemispherical gear having a plurality of apertures positioned to assume centers of adjacent uniformly sized hexagons when inscribed on the hemispherical surface, said apertures on said third gear receiving said projecting teeth of said first and said second gears and providing a driving engagement therebetween, a means to maintain said third gear in rocking and meshing driving engagement with said first and said second gears comprising, collars on each of said first, second and third gears, rings rotatably mounted in each of said collars, shaft means mounted on each of said collars transverse to the axis of rotation to each of said gears, guide means on said casing for said ring mounted on said first gear extending parallel to the axis of said driving shaft, guide means on said casing for said ring on said second gear extending parallel to the longitudinal axis of said driven shaft, guide means on said casing for said ring on said third gear positioned diagonally of said first and said second guide means, yoke means rotatably mounting said shafts on said rings in parallel relationship, and a means to rock said yoke element and third gear, said transmission adapted to continuously vary the rotation ratio of the driving shaft and driven shaft when said gear is rocked to vary the radius of the lines of meshing contacts of said first, second and third gears.

3. A variable ratio gear transmission comprising, a driving shaft having a longitudinally extending splined aperture, a first splined shaft slidably disposed in said splined aperture of said driving shaft, a first hemispherical gear mounted in said first splined shaft, a plurality of spaced radially projecting teeth on said hemispherical gear positioned to assume the centers of adjacent uniformly sized hexagons when inscribed on the hemispherical surface, a driven shaft positioned transverse to the longitudinal axis of said driving shaftt and having a longitudinally extending splined aperture, a second splined shaft slidably disposed in said splined aperture of said driven shaft, a second hemispherical gear mounted on said second splined shaft, a plurality of spaced radially projecting teeth on said second hemispherical gear positioned to assume centers of adjacent uniformly sized hexagons when inscribed on the hemispherical surface, a third hemispherical gear in engagement with said first and said second hemispherical gear, said third hemispherical gear having a plurality of apertures uniformly positioned to assume centers of uniformly sized hexagons when inscribed on the hemispherical surface, said apertures receiving said projecting teeth of said first and said second hemispherical gears and providing a driving engagement therebetween, a means to maintain said third gear in rockable and meshing engagement with said first and said second gears comprising, collars of said first, second and third gears, rings rotatably mounted in each of said collars, a yoke means connected to each of said collars, guide means for said yoke for maintaining the relative positions of said first, second and third gear means to maintain a meshing driving engagement between said gears, said transmission adapted to continuously vary the rotational ratio of the driving shaft and driven shaft when said third gear is rocked to vary the meshing contact radii of said first, second and third gears.

4. A gear transmission comprising, a driving shaft, longitudinally slidable means on said driving shaft, a first hemispherical gear mounted on said slidable means on said driving shaft, a driven shaft, a longitudinally slidable means on said driven shaft, said driven shaft positioned with the longitudinal axis thereof positioned transverse to the longitudinal axis of said driving shaft, a second hemispherical gear mounted on said slidable means on said driven shaft, a third hemispherical gear in engagement with said first and said second hemispherical gears, meshing means on said first, said second and said third gears positioned thereon in relation to uniformly sized hexagons when inscribed on the respective hemispherical gears, a yoke means connected to said first, second and third gears to maintain therebetween a meshing relationship, said yoke means having means for rotatably supporting said first, said second and said third gears in rotatable relation relative to said yoke, and a guide means for said yoke, said transmission adapted to continuously vary the rotation ratio of the driving shaft and the driven shaft when said third gear is rocked to vary the meshing contact radius of the first, second, and third gears.

5. A gear transmission comprising, a driving shaft, a first hemispherical gear, means slidably supporting said first hemispherical gear on said first driving shaft, a driven shaft positioned with the longitudinal axis transverse to the longitudinal axis of said driving shaft, a second hemispherical gear, means slidably supporting said second hemispherical gear on said driven shaft, a third hemispherical gear, meshing means on said first, said second and said third gears, means supporting said third gear in rockable and rotatable meshing engagement with said first and said second gears comprising, a yoke, and means rotatably connecting said yoke to said first, second and third gears, said transmission adapted to vary the rotation ratio of the driving shaft and driven shaft when said third gear is rocked.

6. A gear transmission comprising, a first gear having a hemispherical shaped surface, a shaft means slidably supporting said first gear, a second gear having a hemispherically shaped surface, a shaft slidably supporting said second gear, a third gear having a hemispherically shaped surface, engagement means on the hemispherical shaped surfaces of the first, second and third gears connecting same in meshing and driving relation, and means rotatably connected to said first and second gears for rotatably rocking and supporting said third gear and providing a driving engagement with said first, second and third gears.

7. A transmission comprising, a first gear having a segmental spherical shaped surface, a second gear having a segmental spherical shaped surface, a third gear having a segmental spherical shaped surface, means on said semispherical shaped surfaces of said first, second and third gears connecting same in driving relation, and means movably supporting said third gear to selectively vary its rotational axis relative to said first and second gears while maintaining operative relationship therewith to thereby produce a variable rotational ratio of said first and second gears.

8. A variable ratio gear combination comprising, a first hemispherical gear, a plurality of spaced radially projecting teeth on said first hemispherical gear uniformly and symmetrically positioned to assume centers of adjacent hexagons of uniform size when inscribed on the hemispherical surface, a second hemispherical gear, a plurality of spaced apertures uniformly and symmetrically positioned to assume centers of adjacent hexagons of uniform size when inscribed on the hemispherical surface, said apertures receiving said projecting teeth of said first hemispherical gear and providing a driving engagement between said first and said second gear, said gears adapted to maintain meshing contact when the respective rotational axis of the gears are inclined and thereby produce a variable rotation ratio by varying the lines of contact of the radius of said gears.

9. A gear combination comprising, a first gear having a segmented spherical shaped surface, a plurality of spaced radially projecting teeth on said first gear positioned to assume the centers of adjacent uniformly sized hexagons when inscribed on the spherical surface, a second gear having a segmented spherical shaped surface, a plurality of apertures on the spherical surface of said second gear positioned to assume the centers of adjacent uniformly sized hexagons when inscribed on the spherical surface, said apertures receiving said projecting teeth of said first gear and providing a meshing engagement therebetween, said gears adapted to maintain meshing engagement irrespective of the relative inclination of said axes of rotation of the first and second gears.

10. A gear combination comprising, a first gear having a segmental spherical shaped surface, a second gear having a segmental spherical shaped surface in contact with said first gear, engagement means on said spherical shaped surfaces of said first and said second gears connecting same in meshing relation, means connected to said second gear for rocking radial movement about said first gear to maintain driving contact and the relative rotational ratio constant, and said gears adapted to maintain driving relation when the axes of rotation of said gears are inclined.

11. A transmission means comprising, a first drive means having a hemispherically shaped surface, means slidably supporting said first drive means for axial movement, a second drive means having a hemispherically shaped surface, means slidably supporting said second drive means, an intermediate drive means having a hemispherically shaped surface, control means maintaining said first and second drive means in operable engagement with said intermediate drive means, and means interconnected to said intermediate drive means for rotatably rocking and supporting the same while maintaining engagement with said first and second drive means thereby providing a variable rotation ratio therebetween.

References Cited

UNITED STATES PATENTS

| 1,674,698 | 6/1928 | Olson | 74—198 X |
| 1,793,571 | 2/1931 | Vaughn | 74—198 |
| 2,609,703 | 9/1952 | Hesch | 74—198 X |
| 2,693,709 | 11/1954 | Newell | 74—198 |

FOREIGN PATENTS 438,750   8/1948   Italy.

DONLEY J. STOCKING, *Primary Examiner.*

DAVID J. WILLIAMOWSKY, *Examiner.*

L. H. GERIN, *Assistant Examiner.*